United States Patent
Madhusudhana et al.

(10) Patent No.: US 7,475,003 B1
(45) Date of Patent: Jan. 6, 2009

(54) METHOD AND APPARATUS FOR INITIATING CALL ANALYSIS USING AN INTERNET PROTOCOL PHONE

(75) Inventors: Deerendra Madhusudhana, Karnataka (IN); Girish M. Ganeshmurthy, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 995 days.

(21) Appl. No.: 10/683,954

(22) Filed: Oct. 9, 2003

(51) Int. Cl.
*G06F 15/173* (2006.01)

(52) U.S. Cl. .................. 703/223; 709/217; 709/219; 370/356

(58) Field of Classification Search .......... 709/223, 709/217–219; 379/212.01, 900; 370/356, 370/357
See application file for complete search history.

(56) References Cited

U.S. PATENT DOCUMENTS

| | | | | |
|---|---|---|---|---|
| 6,614,781 | B1 * | 9/2003 | Elliott et al. | 370/352 |
| 2003/0177208 | A1 * | 9/2003 | Harvey, IV | 709/221 |
| 2003/0227870 | A1 * | 12/2003 | Wagner et al. | 370/229 |
| 2003/0235280 | A1 * | 12/2003 | Shafie-Khorasani et al. | 379/112.01 |
| 2004/0249650 | A1 * | 12/2004 | Freedman et al. | 705/1 |
| 2005/0069097 | A1 * | 3/2005 | Hanson et al. | 379/88.12 |

OTHER PUBLICATIONS

Cisco Systems, Inc., "Network Monitoring Using Cisco Service Assurance Agent," Cisco IOS Configuration Fundamentals Configuration Guide, Release 12.1, First Published: Jul. 2000; Last Updated: May 2002, pp. FC-281-FC-302.

* cited by examiner

*Primary Examiner*—Frantz B. Jean
(74) *Attorney, Agent, or Firm*—Hickman Palermo Truong & Becker

(57) ABSTRACT

Call analysis is initiated from an IP phone. In one embodiment, the phone accesses configuration information that is associated with the phone. The configuration information includes information about an associated network management system (NMS), such as an IP address of a NMS and specification of a particular port of the NMS to which alerts are to be sent. Further, the IP phone transmits an alert to the NMS. The alert informs the NMS about the call with which a problem is encountered and serves as a request for analysis of the call. For example, the alert is automatically triggered by the phone in response to determining that an issue or problem exists with the call that warrants analysis of the call. In the latter example, the IP phone is provisioned with algorithms for detecting and identifying various problems that may be encountered in IP telephony environments.

22 Claims, 6 Drawing Sheets

METHOD AND APPARATUS FOR INITIATING CALL ANALYSIS USING AN INTERNET PROTOCOL PHONE

FIELD OF THE INVENTION

The present invention generally relates to communication networks. The invention relates more specifically to a method and apparatus for initiating call analysis using an Internet Protocol (IP) phone.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet Protocol (IP) telephony is a technology that is being widely implemented and gaining widespread acceptance. However, IP telephony systems do, at times, experience quality and performance problems. For example, some types of problems that are typically encountered in IP calls include one-way speech, choppy voice quality, excessive echo, jitter (which is the variation in the time between packets arriving), absence of a dial tone, and inability to dial a number or break a dial tone.

In past approaches, when a user experiences such problems with a voice call, the user typically must contact a help desk personnel and explain the symptoms of the problem. The help desk personnel notes the problem and informs a system administrator, who may then identify and analyze the problem in an attempt to diagnose the technical source of the problem. Often, the administrator uses a network management system in the call analysis process. Examples of commercially available network management systems are Cisco-Works IP Telephony Environment Monitor (ITEM), Routed Wide Area Network Management (RWAN), and CiscoWorks LAN Management Solution (LMS) from Cisco Systems, Inc. of San Jose, Calif. In addition, an administrator may use agent software embedded in network devices, such as routers, for active monitoring of telephony-based network traffic. One example of a commercially available agent is Service Assurance Agent (SAA), which is embedded software within Cisco IOS devices and which performs active monitoring to provide a set of network performance measurements.

However, by the time the administrator is alerted and completes the call analysis process, hours may have passed. Therefore, in the interim period, the user may be left with a "deficient" telephony environment. Furthermore, IP telephony environment traffic is dynamically changing. Therefore, by the time the administrator completes the call analysis process, the network may have converged and the administrator has no indication of and cannot replicate the problem originally encountered and reported to the help desk.

One possible solution is to configure an NMS to continuously monitor all possible end-to-end call paths between all relevant IP phones, such as IP phones coupled to an enterprise network. Such a solution is not scalable and, therefore, not ideal because of the number of call paths that a given NMS may have to continuously monitor. For n phones, there are $(n*(n-1))/2$ possible call paths. Furthermore, monitoring the possible call paths involves monitoring the layer 2 and layer 3 activities for a given call path while not allowing generation of any calls via the given call path. Consequently, as the number of phones in a IP telephony environment increases, such a solution places an increasing burden on the NMS and increasingly wastes network bandwidth.

Based on the foregoing, there is a clear need for a scalable technique for initiating call analysis in an IP telephony environment as soon as a problem occurs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
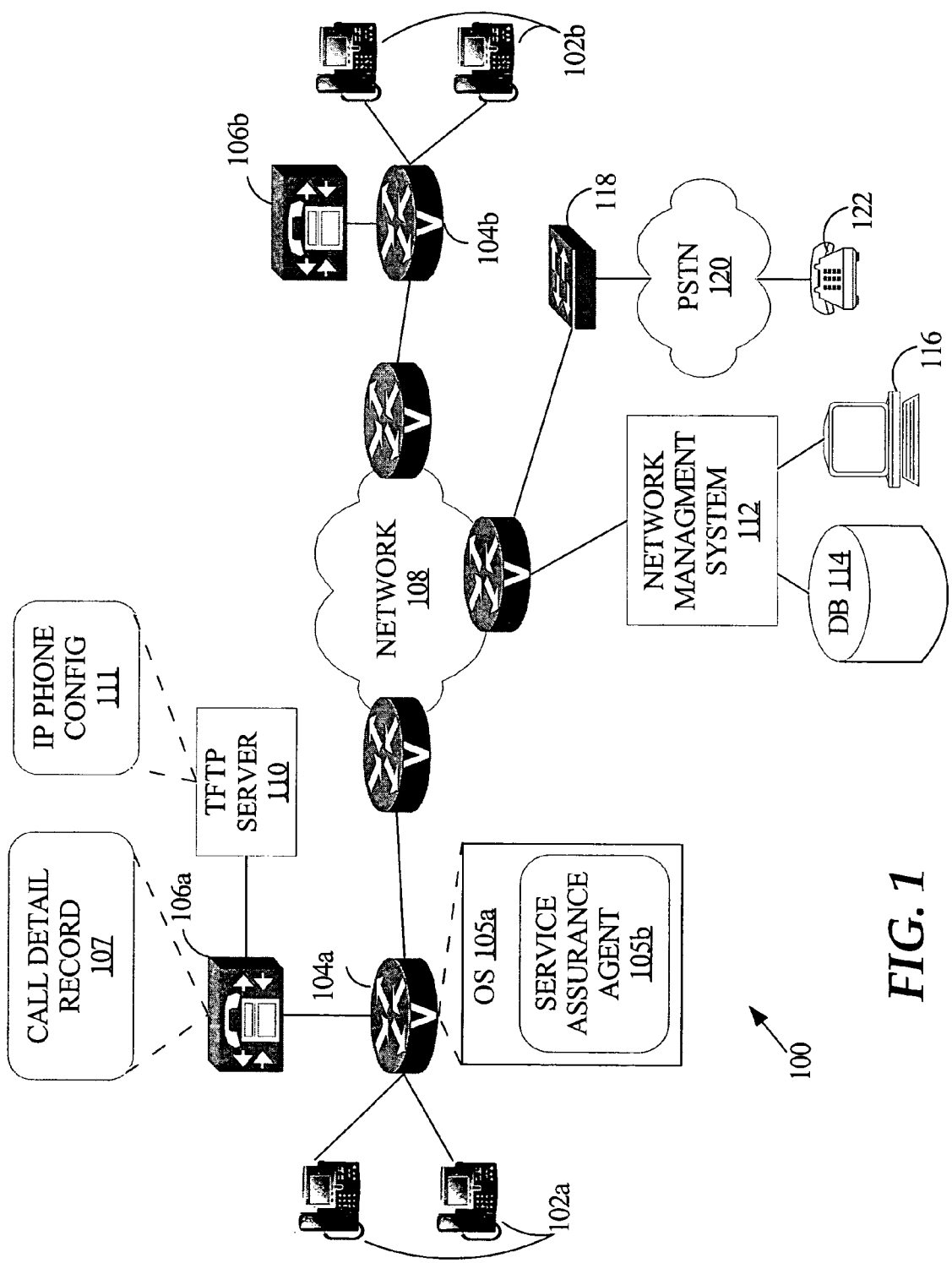
FIG. 1 is a block diagram of an example operating environment in which an embodiment may be implemented.

A method and apparatus for initiating call analysis using an IP phone is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

```
1.0  General Overview
2.0  Structural and Functional Overview
     2.1  Operating Environment Example
     2.2  Telephony Concepts and Terminology
          2.2.1  Dejitter Buffer
          2.2.2  Voice Activity Detection (VAD)
          2.2.3  SCCP Messages
3.0  Method For Initiating Call Analysis Using an IP Phone
     3.1  Obtaining Network Management System Information
     3.2  User-Initiated Alert
     3.3  Phone-Initiated Alert
          3.3.1  No DialTone
          3.3.2  Unable to Break Dial Tone
          3.3.3  One-Way Speech
          3.3.4  Excessive Jitter
          3.3.5  Excessive Packet Loss
          3.3.6  Percentage Packet Loss
     3.4  Alert Message
4.0  Implementation Mechanisms
     4.1  Call Analysis
          4.1.1  Path Analysis
          4.1.2  Service Assurance Agent
     4.2  Network Management System
     4.3  Hardware Overview
5.0  Extensions and Alternatives
```

1.0 General Overview

Since overall traffic in IP telephony environments is quite dynamic, immediate commencement of analysis of a given call is beneficial. Therefore, an analyzing system, such as a network management system, should immediately be made aware of a problem regarding a call, rather than waiting for the cycle of (a) a user notifying a help desk, (b) the help desk forwarding the problem to an administrator, and (c) the administrator invoking tools to analyze the call.

Therefore, techniques for initiating call analysis from an IP phone are described.

According to one aspect, call analysis is initiated from an IP phone. In one embodiment, the phone accesses configuration information that is associated with the phone. The configuration information includes information about an associated network management system (NMS). For example, the phone obtains its configuration information from a call manager, which is acting as a TFTP (Trivial File Transfer Protocol) Server. The configuration information includes an IP address of a NMS and specification of a particular port of the NMS to which alerts are to be sent. Further, the IP phone transmits an alert to the NMS. The alert informs the NMS about the call with which a problem is encountered and serves as a request for analysis of the call. For example, the alert may be manually triggered through use of a button or similar device on the phone, or the alert may be automatically triggered by the phone in response to determining that an issue or problem exists with the call that warrants analysis of the call. In the latter example, the IP phone is provisioned with algorithms for detecting and identifying various problems that may be encountered in IP telephony environments.

Another aspect is from the perspective of a network management system. In an embodiment, an alert is received from the IP phone. In response to receiving the alert, the call is analyzed. For example, the alert is received and the consequent analysis is performed by a NMS. In one embodiment, the NMS determines that the alert is a request for call analysis based on receiving the alert message at a particular port, such as the port specified in the phone configuration information described above.

2.0 Structural and Functional Overview 2.1 Operating Environment Example

FIG. 1 is a block diagram of an example operating environment 100 in which an embodiment may be implemented.

In environment 100, one or more phones 102a are communicatively coupled to one or more phones 102b through a series of network components constituting a network 108. For example, phones 102a, 102b are IP communication-based physical phones that communicate over a communications network, such as an enterprise LAN or the public Internet, using one or more IP telephony protocols. For another example, phones 102a, 102b are personal computers on which software executes to provide IP telephony services and functionality. Non-limiting examples of suitable communication protocols that are utilized by the phones 102a, 102b include ITU-T H.323, SIP (Session Initiation Protocol), MGCP (Media Gateway Control Protocol), SCCP (Skinny Client Control Protocol).

The communications network 108 may contain any number of network infrastructure elements including routers, switches, gateways, etc. In one embodiment, the network is an enterprise IP network in which infrastructure elements execute a conventional routing protocol for routing packets among the infrastructure elements. Although embodiments are described herein with reference to the TCP/IP protocol, implementations are not limited to use of TCP/IP. Rather, other network communication protocols, including protocols that are not yet developed, may be used to implement these techniques.

Phones 102a are communicatively coupled to a conventional router 104a, which is communicatively coupled to network 108. Router 104a includes network system software or operating system 105a. A non-limiting example of such software is Cisco IOS® software.

In an embodiment, operating system 105a includes a Service Assurance Agent (SAA) 105b, which allows for monitoring network performance between, for example, router 104a and a remote device, such as router 104b. In an embodiment, SAA 105b is utilized in analyzing a call between a phone 102a and another call endpoint, such as a phone 102b. For non-limiting examples, SAA 105b is utilized to analyze (1) end-to-end response time; (2) hop-by-hop response time; (3) end-to-end jitter analysis; and (4) hop-by-hop jitter analysis.

A specific implementation of SAA 105b is described in the document entitled "Service Assurance Agent", published by Cisco Systems, Inc. as "saaoper.pdf" and the document entitled "Network Monitoring Using Cisco Service Assurance Agent", published by Cisco Systems, Inc. as "fcd301d.pdf" as a chapter of "Cisco IOS Configuration Fundamentals Configuration Guide, Release 12.1", both of which are incorporated by reference in their entirety for all purposes as if fully set forth herein. However, embodiments are not limited to use of the SAA described in the referenced documents. Rather, the functionality described in the referenced documents represents an example of call analysis functionality that may be implemented with embodiments described herein. Other embodiments may use different means for performing equivalent functions of SAA 105b.

A call manager 106a is communicatively coupled to router 104a and, therefore, communicatively coupled to phones 102a. Phones 102a are registered with call manager 106a, which provides management and processing of IP telephony calls from phones 102a. One non-limiting example of a call manager 106a is Cisco CallManager from Cisco Systems. Additional data, voice, and video services such as unified messaging, multimedia conferencing, collaborative contact centers, and interactive multimedia response systems may interact with an IP telephony environment through an API associated with call manager 106a.

Furthermore, call manager 106a records a call detail record (CDR) 107 for network devices, such as phones 102a, that it serves. As described further below, a network management or other system that is invoked to perform call analysis in response to an IP phone-initiated or user-initiated alert may request one or more call detail records 107 from a call manager 106a to determine, for example, a call destination IP address.

As illustrated in FIG. 1, operating environment 100 includes network devices similar to phones 102a, router 104a, and call manager 106a, which are configured at one or more other points from network 108. Specifically, example operating environment 100 includes IP phones 102b, router 104b and call manager 106b, which are similarly configured and functioning as network devices 102a, 104a, 106a. Therefore, the descriptions provided above for phone 102a, router 104a and call manager 106a also apply to phone 102b, router 104b and call manager 106b. The techniques described herein are primarily described from the viewpoint of a phone 102a as the source of an IP call and a phone 102b as the destination of such IP call. However, the techniques are equally applicable with a phone 102b as a call source and a phone 102a as a call destination.

Operating environment 100 may further include a conventional non-IP phone 122 coupled to the PSTN 120, which is coupled to network 108 via a gateway 118. Inclusion of phone 122 in FIG. 1 illustrates that a call analysis that is initiated and performed according to the techniques described herein may involve analysis of a call from an IP phone, such as phones 102a, 102b, to a non-IP phone 122. Hence, both the source phone and destination phones are not required to be part of the same enterprise network, nor is the destination phone, which is the "passive" phone with respect to the call analysis initiation process, required to be an IP-enabled phone.

Operating environment 100 includes, in one embodiment, a TFTP server 110 communicatively coupled to phones 102a via gateway 104a. For example, call manager 106a may be configured to function as a TFTP server. A phone 102a, 102b may download respective configuration information or files, such as an IP phone configuration 111, from a TFTP server 110. However, a phone 102a, 102 b may download relevant configuration information from a source other than a TFTP server 110.

In an embodiment, phone configuration 111 includes information about an associated network management system (NMS) 112 through which a phone 102a, 102b is managed and/or administered. For example, phone configuration 111 includes an identification of (1) the IP or other network address associated with NMS 112 and (2) the port on which NMS 112 expects to see call analysis alerts from phones that NMS 112 manages, such as phones 102a, 102b.

NMS 112 optionally may be coupled to a database 114, to which NMS 112 can store and from which NMS 112 can retrieve information that is pertinent to its call analysis functionality. Furthermore, NMS 112 is typically coupled to a terminal or workstation 116 to facilitate administrator interaction with NMS 112 as well as with devices managed by NMS 112, such as phones 102a, 102b. NMS 112 may be implemented to execute on a server or workstation, for example. However, the device on which it executes is not important and may vary from implementation to implementation.

2.2 Telephony Concepts and Terminology 2.2.1 Dejitter Buffer

A dejitter buffer transforms variable delay associated with voice packet arrival into a fixed delay by holding the first sample received for a period of time before playing it out. This holding period is known as the initial "play-out delay". Play-out delay will add to end-to-end delay. This play-out delay generally represents the inter-packet arrival time.

For example, suppose the play-out delay is 40 ms, which means that the first voice packet that is received when the dejitter buffer is empty will be held for 40 ms before it is played out. This implies that a subsequent packet received from the network may be as much as 40 ms delayed (with respect to the first packet) without any loss of voice continuity. If the subsequent packet is delayed more than 40 ms, the de-jitter buffer will empty and the next packet received will be held for 40 ms before play out to reset the buffer. This will result in a gap in the voice played out for about 40 ms. Thus, even though packets are arriving at the IP phone, some of the packets may be discarded or dropped because they are arriving late and this will result in a gap in the voice play out.

A dejitter buffer can either be fixed or adaptive. With a fixed buffer, the play-out delay will not change from the initial value. Hence, if packets are arriving later than the play-out time then they will be discarded and there will be gap in voice. With an adaptive buffer, if the packets are consistently arriving late and form a pattern, then the play-out time will change or adapt. However, there is a limit to which the play-out time can be increased because if the corresponding play-out delay keeps increasing then the end-to-end delay between the two endpoints will increase to an unacceptable degree. The dejitter buffer present in IP phones are typically adaptive in nature. Hence, in an embodiment, phones 102a, 102b include an adaptive dejitter buffer.

2.2.2 Voice Activity Detection (VAD)

Most IP-based telephony systems include a voice activity detector. The purpose of the detector is to detect silence periods in the voice signal and temporarily discontinue transmission of the signal during the silence period. This saves network bandwidth and allows the far-end device to adjust its dejitter buffer. Usually, comfort noise is played out to the listener to mask the absence of an audio signal. Comfort noise is usually modeled on the local endpoint noise so that there is not a stark contrast when switching from the actual background noise to the comfort noise.

2.2.3 SCCP Messages

The following are commonly-used SCCP (Skinny Client Control Protocol) messages.

StationOffHook Message

An IP phone station uses this message to notify a call manager that the phone station is now in an off-hook condition.

StationStartTone Message

A call manager uses this message to command the IP phone to play a dial tone.

StationKeypadButton Message

IP phone stations use this message to inform a call manager when a keypad button is pressed.

StationOpenReceiveChannel Message

A call manager uses this message to cause the IP phone to begin receiving a unicast RTP stream. This message also specifies the type of codec to be used and also the packet size to be used.

StationOpenReceiveChannelAck Message

This message contains the status of the open channel action and it also contains the receive IP address and port number for transmission to the remote end.

StationStartMediaTransmission Message

A call manager uses this message to command the IP phone to begin transmitting the audio stream to the indicated remote RTP address and port.

3.0 Method for Initiating Call Analysis Using an IP Phone 3.1 Obtaining Network Management Information In an embodiment, when an IP phone such as phones 102a, 102b are initialized for a given communication session, or "booted up", the phone communicates with TFTP server 110 to download a configuration file, such as IP phone configuration 111. Generally, the configuration file may include various information that is relevant to the given phone, such as information that identifies (1) a primary call manager, such as call manager 106a; (2) a secondary call manager; (3) a tertiary call manager; and (4) phone Ethernet ports for the call managers. In this embodiment, information about the NMS 112 that is associated with the given phone is included in the configuration 111 that is downloaded by the phone. Information about the NMS 112 that is included in configuration 111 is the IP or other network address of the NMS 112 and the port at which NMS 112 expects to receive alerts that function as requests for a call analysis. A non-limiting implementation of a portion of a configuration file, relative to the NMS information, is as follows:

<NetworkManagementServer>
<NMSNodeIPAddress>10.76.30.19</NMSNodeIPAddress>
<port>8888</port>
</NetworkManagementServer>

Hence, with this information provided in configuration 111, the phone becomes aware of the NMS 112 that it is to contact when submitting an alert for a call analysis. At the NMS 112, a listener process listens for alert requests from phones 102*a*, 102*b* and starts the call analysis upon such requests.

In an embodiment, non-limiting additional parameters are provided to phone 102*a*, 102*b* in configuration 111, as follows:

```
<Parameters>
    <MAXIMUM_ALLOWED_TIME_FOR_DIALTONE_TO_TURNUP>
        250 ms
    </MAXIMUM_ALLOWED_TIME_FOR_DIALTONE_TO_TURNUP>
    <ONE_WAY_SPEECH_TIME_INTERVAL>
        1000 ms
    </ONE_WAY_SPEECH_TIME_INTERVAL>
    <MAX_JITTER_ALLOWED>
        150 ms
    </MAX_JITTER_ALLOWED>
    <MAX_ALLOWED_VOICELOSS_DURATION>
        500 ms
    </MAX_ALLOWED_VOICELOSS_DURATION>
    <MAX_ALLOWED_PERCENTAGE>
        5
    </MAX_ALLOWED_PERCENTAGE>
</Parameters>
```

These parameters are relevant to routines executed by phones 102*a*, 102*b* according to embodiments described further below. Further these parameters are user configurable in a call manager, such as call manager 106*a*, 106*b*, and can be fine-tuned for a given network.

3.2 User-Initiated Alert

In an embodiment, an IP phone, such as phones 102*a*, 102*b* (FIG. 1), is configured to allow a user to manually initiate a call analysis. For example, if an IP Phone is not enabled to send alerts automatically, then a user instead can send alerts to NMS 112 by depressing or clicking on a "Diagnosis" or similar button or "link" associated with the IP phone. In another embodiment, the phone is configured to allow a user to manually initiate the call analysis by depressing or keying in a pattern of numbers.

There are two possible scenarios regarding user-initiated call analysis from an IP phone, one in which the user requests call analysis ("Diagnosis") while the call is still active (i.e., the phone is "Off Hook") and one in which the user requests call analysis as soon as the call is completed (i.e., the phone is "On Hook"). According to one embodiment, when the user uses the button, various options regarding the problem that was encountered with the call are provided to the user via the phone. For example, the following or similar options are provided:

1) No Dial Tone;
2) Unable to break Dial Tone;
3) One-Way Speech;
4) Garbled/Choppy/Robotic Voice;
5) Lot of Silence in Speech.

Based on the options presented, and the nature of the problem, the user can select the appropriate number via the number mechanism associated with the phone. In response, an alert informing the NMS 112 about the problem is sent from the phone 102*a*, 102*b* to the NMS 112. Such alert is understood to be a request for analysis of the relevant call by NMS 112.

In the scenario in which the call is still active, all the information required by NMS 112 to start analysis is available. However, in the scenario in which the call is already completed, all the information except for the destination IP address will be available because the phone has gone "on hook" and then the alert was issued. Therefore, in this scenario, the NMS 112 will retrieve the CDR 107 information from the call manger 106*a* that is associated with the source phone and determine the network address of the destination phone involved in the call of interest, such as the most recent call. Once the NMS 112 receives and retrieves the necessary information, the NMS will have all the information that it needs to begin analysis of the call.

3.3 Phone-Initiated Alert

In an embodiment, an IP phone, such as phones 102*a*, 102*b* (FIG. 1), is configured to automatically determine the presence of an issue or problem with a call and to automatically send an alert to initiate a call analysis. Phones 102*a*, 102*b* are configured with software that provides the capability for automatically determining voice quality issues and raising the alert to the NMS 112.

Figure 2A:
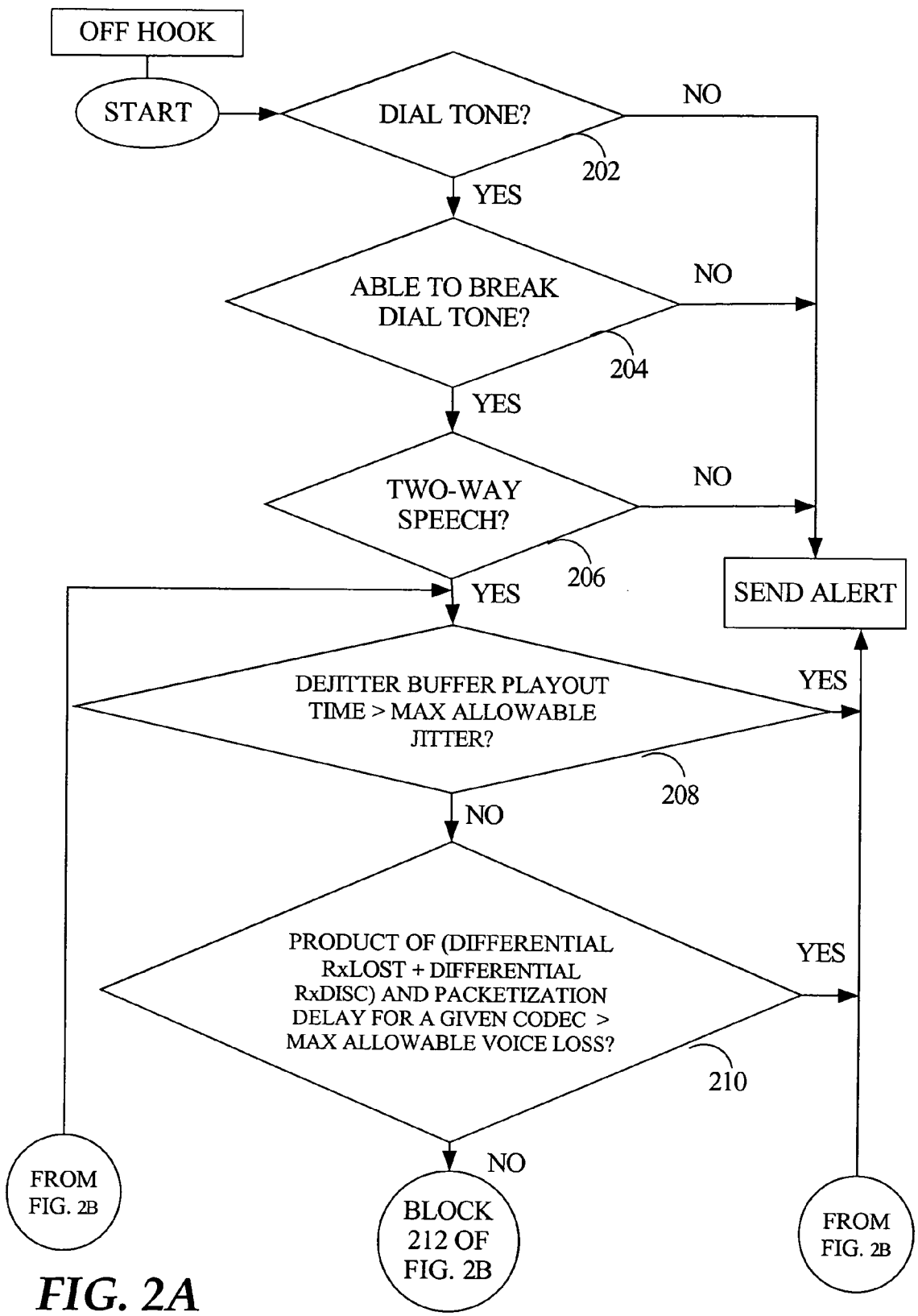
FIGS. 2A and 2B show a flow diagram that illustrates a process for automatically determining an issue or problem with a call.
Figure 2B:
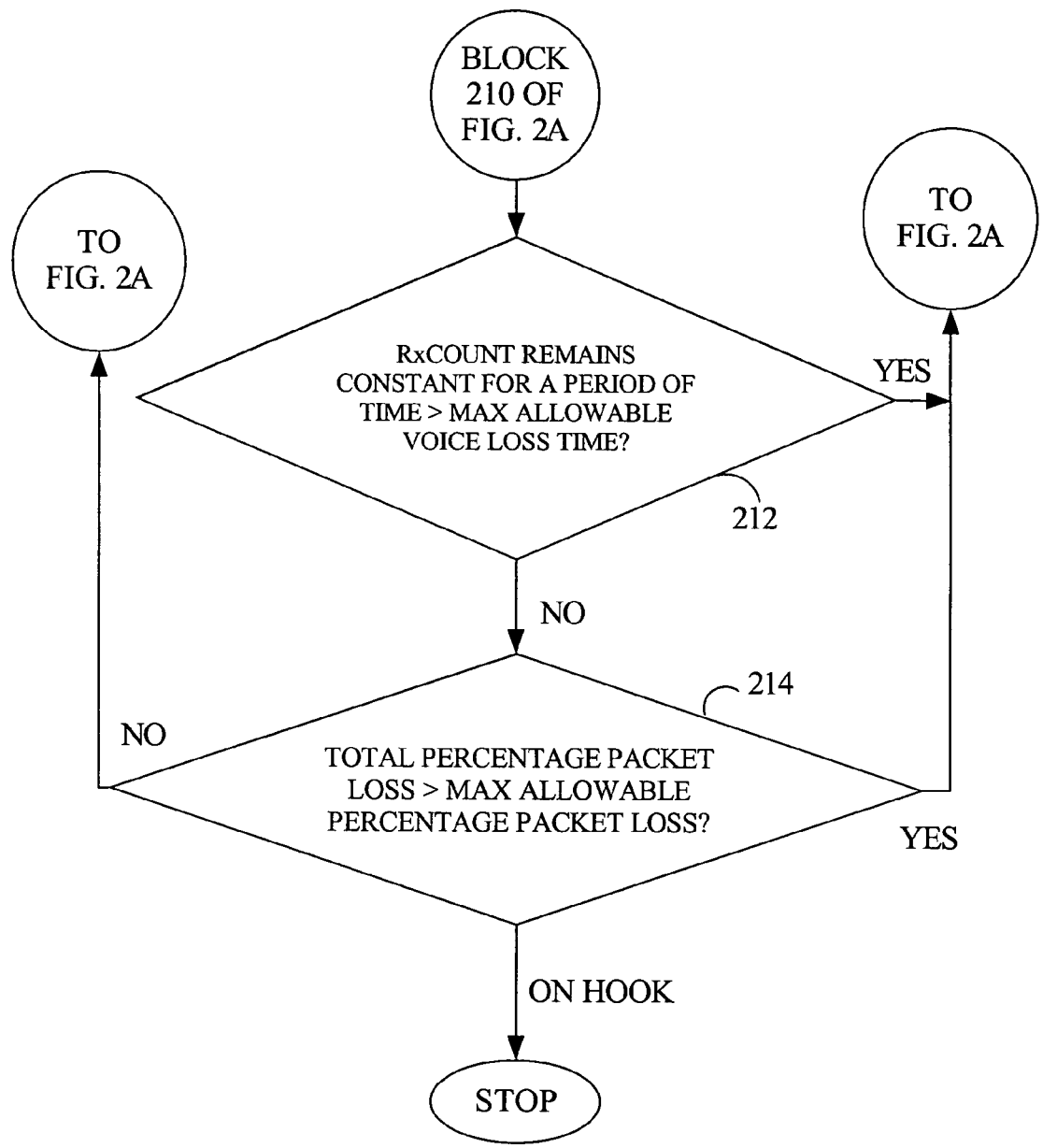

FIG. 2A and FIG. 2B show a flow diagram that illustrates a process for automatically determining an issue or problem with a call. According to one embodiment, the process illustrated in FIGS. 2A and 2B is performed by an IP phone, such as phones 102*a*, 102*b*. For purposes of the description of FIGS. 2A and 2B, a phone 102*b* is considered the destination endpoint of the call of interest and phone 102*a* is considered the originating endpoint or source of such call. The various tests that may be performed by phone 102*a* may vary from implementation to implementation. Hence, all of the tests or determinations that are illustrated in FIGS. 2A and 2B are not required to be performed. The process begins once the phone 102*a* goes off hook.

3.3.1 No Dial Tone

At block 202, it is determined whether the phone suitably plays a dial tone. As soon as the phone goes off hook, IP phone 102*a* sends a "StationOffHook" SCCP message to the call manager 106*a*. The call manager 106*a* then sends a "StationStartTone" SCCP message to phone 102*a*. When the "StationStartTone" message is received by phone 102*a*, phone 102*a* plays the dial tone locally.

If the "StationStartTone" message is not received by phone 102*a* within a suitable time period, then an alert is raised. Hence, the time that elapses between phone 102*a* going off hook and reception of the "StationStartTone" message is determined. If the time taken exceeds a predefined maximum dial tone turnup value, then an alert is sent to NMS 112. Such an alert may indicate that a dial tone is not available or is delayed.

An example of a routine that performs step 202 is as follows, with the stored value of variable MAXIMUM_AL- LOWED_TIME_FOR_DIALTONE_TO_TURNUP specifying the maximum wait time for a dial tone to turn up:

```
Constants:
    MAXIMUM_ALLOWED_TIME_FOR_DIALTONE_TO_TURNUP = 250;
            // 250 ms by default and it is user configurable
Variables:
    offHookTime;  //time when phone went offHook
Wait for following time period to pass: "offHookTime
+MAXIMUM_ALLOWED_TIME_FOR_DIALTONE_TO_TURNUP"
If the StationStartTone message doesn't come up within that time period, then
    Raise an alert to NMS
EndIf
```

3.3.2 Unable To Break Dial Tone

At block 204, it is determined whether phone 102*a* is able to pass DTMF tones or digits to call manager 106*a*. A common problem encountered in Voice over IP (VoIP) networks is when a phone is unable to break the dial tone. In such a scenario, the calling party is unable to pass the dual tone multi frequency (DTMF) tones or digits to the call manager 106*a*, which results in callers being unable to dial the desired phone number and, therefore, unable to place a call.

Some IP phones, such as phone 102*a*, use the "StationKeypadButtonMessage" SCCP message to inform a call manager, such as call manager 106*a*, when a keypad button is pressed, or when a digit is entered in the case of a software-based IP phone. This message can also be reversed and sent from call manager 106*a* to phone 102*a* to indicate reception of the DTMF tones or digits. If phone 102*a* does not receive the reversed "StationKeypadButtonMessage" messages, then an alert is sent to NMS 112. Such an alert may indicate that a the phone is unable to break the dial tone.

A routine that performs step 202 may follow the following logic. For every "StationKeypadButtonMessage" sent by phone 102*a* to call manager 106*a*, determine whether a similar message is received by phone 102*a* from call manger 106*a*, essentially indicating acknowledgement of the DTMF tone or digit. If no such return message is received from call manager 106*a*, then this means that phone 102*a* is unable to break the dial tone and an alert is sent to NMS 112.

3.3.3 One-Way Speech

At block 206, it is determined whether the call is functioning with two-way speech, or whether the fault condition "One-way Speech" is present. Generally, in one-way speech the voice packets are traveling in one direction, such as from the source endpoint to the destination endpoint, but not in the other direction. Since RTP (Real-Time Transport Protocol) streams are typically transported using UDP (User Datagram Packets) and are, therefore, connectionless, traffic may travel successfully in one direction but get dropped or lost in the opposite direction. As a result, a user at one end may not hear voice from the other end.

Soon after call manager 106*a* receives the destination number, it places the call to the network address of the destination endpoint. Then, call manager 106*a* sends a "StationOpenReceiveChannel" SCCP message to both the source phone 102*a* and the destination phone 102*b*. This message indicates the type of codec and payload size to be used by both phones, among other things. Both phones 102*a* and 102*b* acknowledge to call manager 106*a*, using the "StationOpenReceiveChannelAck" SCCP message. The "StationOpenReceiveChannelAck" message contains the IP address and the UDP port that will be used by each of the respective phones 102*a*, 102*b*. Once a communication channel is established between phones 102*a* and 102*b*, call manager 106*a* instructs both phones to start media transmission, using the "StationStartMediaTransmission" SCCP message.

Once the "StationStartMediaTransmission" message is received by phone 102*a*, a routine begins looking for RTP packets from the destination endpoint at the known UDP port of the source endpoint. If RTP packets are not received for a predefined period of time, then an alert is sent to NMS 112. Such an alert may indicate that only one-way speech is present, or that two-way speech is not available.

An example of a routine that performs step 206 is as follows, with the stored value of variable ONE_WAY_SPEECH_TIME_INTERVAL specifying the period of time against which RTP packet arrival is measured:

```
Variables:
    ipAddress;  // IP address of the IP phone
    udpPort;    // UDP port at which IP phone will be listening for RTP
                // stream this port is indicated by IP phone to call
                // manger through StationOpenReceiveChannelAck
    ONE_WAY_SPEECH_TIME_INTERVAL = 1000; //time to wait
    for RTP packets at the specified port
Until "ONE_WAY_SPEECH_TIME_INTERVAL" expires
    Wait For RTP Packets(ipAddress, udpPort)
If Packets did not arrive within the specified
    ONE_WAY_SPEECH_TIME_INTERVAL, then
    Raise an alert to NMS
endIf
```

At times, a user might experience silence during a period of a call; however, such silence generally does not mean non-arrival of RTP packets. During this period, the background noise is typically passed as RTP packets. Hence, in such a scenario, no alert is sent to NMS 112. However if VAD (Voice Activity Detection) is enabled on both phones 102*a* and 102*b*, and if there is a silence period at 102*b*, then no RTP packets are transmitted from 102*b* to 102*a*. This is basically done to save bandwidth, and comfort noise is played at 102*a*. In such scenarios, no alert will be sent to NMS, as it does not warrant any analysis of phone call.

At this point in the process of FIGS. 2A and 2B, it has been determined whether:

(1) dial tone has come up as soon as IP phone goes off hook (block 202);

(2) IP phone is able to send DTMF tones or digits to a call manager (block 204); and (3) there is bi-directional flow of RTP packets (block 206).

Blocks 208, 210, 212, 214 represent a logic loop, in which the call will be monitored for voice quality deterioration all along the call, with alerts raised accordingly. The loop is terminated once the source phone, phone 102*a*, goes on hook.

3.3.4 Excessive Jitter

At block 208, it is determined whether there is excessive jitter in the network by determining whether the play-out time period of the dejitter buffer is greater than the maximum allowable jitter. Excessive jitter can cause issues such as garbled voice, choppy voice, clipped voice and synthetic voice.

Play-out time associated with a dejitter buffer generally is determinative of the average jitter in a network. An increase in the play-out time is an indication of increasing jitter in the network. If the play-out time exceeds a pre-defined value, then an alert is sent to NMS 112. Such an alert may indicate that excessive jitter is present in the system.

In one embodiment, the pre-defined value used for monitoring jitter is 150 ms. This value is used in this embodiment because to implement VoIP over an existing data infrastructure, end-to-end delay should be either 150 ms—ITU-T recommendation, 200 ms—reasonable for private networks, or 250 ms—upper limit that, if crossed, results in deteriorated voice.

End-to-end delay comprises fixed delay, variable delay and play-out delay due to dejitter buffer. Minimally, fixed delay and variable delay together is approximately 100 to 150 ms depending on the network topology. Since the maximum limit is 250 ms, 150 ms is used as the default pre-defined value. However, this value can be modified or fine-tuned for a given network. The pre-defined value is sent to pertinent IP phones by an associated call manager.

An example of a routine that performs step 208 is as follows, with the stored value of variable MAX_JITTER_ALLOWED specifying the period of time against which the dejitter buffer play-out time is measured:

```
Constants:
    MAX_JITTER_ALLOWED = 150; // 150 ms by default, can be
        changed
Variables:
playoutTimePeriod; // Current play-out time interval of dejitter buffer
if playoutTimePeriod > MAX_JITTER_ALLOWED, then
    Raise an alert to NMS
endIf
```

3.3.5 Excessive Packet Loss

At block 210, it is determined whether there is excessive voice packet loss in the network, as follows. Generally, if a lot of voice packets are being dropped, then an alert is sent to NMS 112. Further, if a lot of voice packets are dropped, IP phone will use silence insertion rather than predictive insertion (i.e., replay the previous packet). Thus, due to this silence insertion there will be gap in the voice.

There are two types of packet loss to consider:

(1) packets lost before reaching the IP phone, and (2) packets which have reached the IP phone, but dropped by dejitter buffer due to arriving too late.

IP phones internally monitor these types of packet losses. Two counters are used to record the respective packet losses, (1) RxLost will keep track of packets lost before reaching the IP phone, and (2) RxDisc will keep track of packets that have reached the IP phone but discarded by a dejitter buffer for arriving late.

A gap in the voice becomes noticeable when approximately 500 ms of voice is lost. However, this parameter is configurable. For example, if using G711 codec with 20 ms packetization delay, i.e., every packet has 20 ms worth of voice, then if 25 packets are lost an alert to NMS 112 is sent. The necessary information is made known to phone 102a during the capabilities exchange between phones 102a, 102b and respective call managers 106a and 106b, performed as part of the initial call setup process.

An example of a routine that performs step 210 is as follows, with the stored value of variable MAX_ALLOWED_VOICELOSS_DURATION specifying the period of time against which voice lost due to (a) packets lost before reaching the IP phone, and (b) packets dropped by the dejitter buffer for arriving too late, is measured:

```
Constants:
    MAX_ALLOWED_VOICELOSS_DURATION = 500 ms;
Variables:
    RxLost;    // Number of packets dropped before reaching IP Phone
    RxDisc;    // Number of packets which have reached IP Phone but
               // discarded by dejitter buffer for arriving too late.
    PacketizationDelay;  // packetization delay of the codec being used.
                         // This information is present with IP Phone,
                         // which it gets through
                         // "StationOpenRecieveChannel" message
    currentRxLost = RxLost;
    currentRxDisc = RxDisc;
    Wait for the next packet;
    // When the next packet arrives, if the packet arrives out of sequence,
    // RxLost and RxDisc will be updated. Based on these changes it is
    // determined whether an alert need to be sent or not, as
    // described below.
    diffRxLost = RxLost − currentRxLost;
    diffRxDisc = RxDisc − currentRxDisc;
    if [ (diffRxLost + diffRxDisc) * packetizationDelay>
    MAX_ALLOWED_VOICELOSS_DURATION ] then
        Raise an alert to NMS:
    EndIf
```

At block 212, it is determined whether the RTP packets are continuously not arriving at the source phone for a maximum allowed period of time. This time is user configurable and this value is initially made known to the IP phone using the constant MAX_ALLOWED_VOICELOSS_DURATION.

Once the call is setup, the two phones involved in the call will be exchanging RTP packets continuously. However, if there is a network breakdown in the path between the two phones, the phones will not receive RTP packets at all. In such a case, RxLost and RxDisc counters will not get updated and step 210 will not be able to determine such situation. Therefore, one more counter, RxCount, is used to determine such situations.

RxCount is a counter in IP phone, which represents the number of packets received by the IP phone. If RTP packets are not received by the source IP phone, due to network breakdown, this counter will not be incremented at all. Furthermore, RxCount is not incremented in cases where VAD is enabled and comfort noise is being played at the source phone. With both cases where RxCount is not incremented, an alert will be sent to NMS 112 if RxCount is not incremented for a period of time and VAD is disabled on the source IP phone.

An example of a routine that performs step 212 is as follows, with the stored value of variable MAX_ALLOWED_VOICELOSS_DURATION specifying the period of time against which voice is lost due to continuous loss of RTP packets.

```
Constants:
    MAX_ALLOWED_VOICELOSS_DURATION = 500ms;
Variables:
    RxCount; // Number of packets received by the IP Phone
```

```
If (unchanged(RxCount) for
    MAX_ALLOWED_VOICELOSS_DURATION) and
    (VAD is disabled) then
        Raise an alert to NMS;
EndIf
```

3.3.6 Percentage Packet Loss

At block 214, it is determined whether the total percentage of lost packets exceeds a maximum allowable percentage. The total packet loss that occurred during the entire call is calculated. If the packet loss is greater than a pre-defined percentage of total packets received, such as 5% as the default, an alert will be raised to NMS 112. In such an embodiment, 5% is chosen as the packet loss because most codecs can tolerate 5% packet loss. Such an alert may indicate that the system is experiencing heavy packet loss. The percentage value is user configurable through call manager 106*a*, 106*b*.

An example of a routine that performs the computation regarding the percentage packet loss is as follows:

```
Constants:
    MAX_ALLOWED_PERCENTAGE = 5;
        // 5% by default and is user configurable
Variables:
    totalPacketReceived; //Total Voice Packets received
    totalPacketLost; //Total Voice Packets lost
    totalPacketLostInPercentage =
        (totalPacketLost)/(totalPacketReceived + totalPacketLost) * 100;
        //Total Packet lost in percentage
if totalPacketLostInPercentage > MAX_ALLOWED_PERCENTAGE,
then
    Raise an alert to NMS
endIf
```

Once the phone that initiated the call analysis goes back on hook, the process of FIGS. 2A and 2B terminates.

3.4 Alert Message

NMS 112 listens for alerts from the IP phones 102*a*, 102*b*. For example, NMS 112 monitors messages incoming at port 8888, which is specified to the phones managed by the NMS 112 in the configuration information 111 (FIG. 1) that the phones download from TFTP server 110 (FIG. 1) upon bootup. In an embodiment, the protocol used to communicate with NMS 112 from phones 102*a*, 102*b* is UDP. However, other communication protocols may be used to send an alert from phone 102*a* to NMS 112, such as TCP.

In an embodiment, IP phones 102*a*, 102*b* send the following information to NMS 112 whenever an alert is sent. Values presented are for a specific implementation of the embodiment, but can vary from implementation to implementation.

(A) Time stamp of alert, which indicates the time at which the alert was sent by the IP phone.

(B) Type of initiation, which indicates who initiated the alert. For example, if initiated automatically by the phone, then the field reads "0"; if initiated by a user, then "1".

(C) Type of alert. This field can have the following, or similar, values:

Dial Tone Not Available (0);
Unable to break Dial Tone (1);
One-Way Speech (2);
Jitter alert (3);
Silence Insertion due to packet loss (4);
Heavy Packet loss (5);

(D) Source IP address, which is the IP or other network address of the alert initiator. The source IP address facilitates L2/L3 layer analysis by NMS 112.

(E) Destination IP address, which is the IP or other network address of the phone which forms the other end of call that is the subject of the alert initiator. The destination IP address facilitates L2/L3 layer analysis by NMS 112. This IP address will be null if the user initiates the call analysis after the phone goes on hook. In such cases, the destination IP address will be retrieved from the CDR 107 (FIG. 1) information stored in the call manager 106*a* (FIG. 1).

(F) Call manager IP address, which is the IP or other network address of the call manager to which the initiating phone is registered. When phone 102*a* initiates the alert and alert type 0 (no dial tone) or 1 (unable to break the dial tone) is issued, then it is determined whether the path between the call manager 106*a* and the phone 102*a* is overloaded or the call manager is overloaded. If user initiates the alert, then the call manager IP address is used to retrieve CDR information 107 (FIG. 1) from call manager 106*a* (FIG. 1). Using CDR information 107, the IP address of the last phone called from the alert-initiating phone is obtained and analysis can be started by NMS 112.

(G) Source directory number, e.g., the "phone number" of the source; and (H) Destination directory number, e.g., the "phone number" of the destination.

4.0 Implementation Mechanisms

The following implementation mechanisms are non-limiting examples, which are related to a specific implementation. However, details may vary from implementation to implementation. Hence, the following sections are not to be construed to limit use of embodiments of the invention.

4.1 Call Analysis

As described herein with respect to embodiments, a network management system 112 is alerted to an issue with an IP-based call, by an IP phone 102*a*, 102*b*. NMS 112 performs a call analysis in response to the alert. However, an alert to and invocation of any suitable mechanism for automated or semi-automated call analysis other than an NMS 112 is within the scope of the embodiments described.

After analysis of the telephony network, NMS 112, or whatever other mechanism is used to analyze the call, generates a report. Furthermore, NMS 112 can be configured to notify a system administrator regarding the report and its findings.

4.1.1 Path Analysis

In one implementation, NMS 112 calls upon "Path Analysis" technology to perform at least a portion of the call analysis initiated by phone 102*a*. For example, such technology may be used to identify and/or diagnose layer 2 and layer 3 discrepancies.

Path analysis technology that can be implemented with embodiments, and an associated operations and diagnostic application that traces the connectivity between two specified points on a network, including the physical and logical paths taken by packets flowing between those two points, is described in Chapter 5 of "User Guide for Campus Manager" (Cisco Systems, Inc. Part No. 78-15051-01), entitled "Tracking Packet Flow Using Path Analysis", which is incorporated by reference in its entirety for all purposes as if fully set forth herein.

4.1.2 Service Assurance Agent

In one implementation, NMS 112 calls upon a "Service Assurance Agent" to perform at least a portion of the call analysis initiated by phone 102*a*. For example, such technology may be used to determine end-to-end and hop-by-hop response times as well as to perform end-to-end and hop-by-hop jitter analyses.

Service Assurance Agent technology that can be implemented with embodiments, and which provides for monitoring network performance by measuring key metrics such as response time, network resources, availability, jitter, connect time, packet loss and application performance, is described in the document entitled "Service Assurance Agent", published by Cisco Systems, Inc. as "saaoper.pdf" and the document entitled "Network Monitoring Using Cisco Service Assurance Agent", published by Cisco Systems, Inc. as "fcd301d.pdf" as a chapter of "Cisco IOS Configuration Fundamentals Configuration Guide, Release 12.1".

4.2 Network Management System

Figure 3:
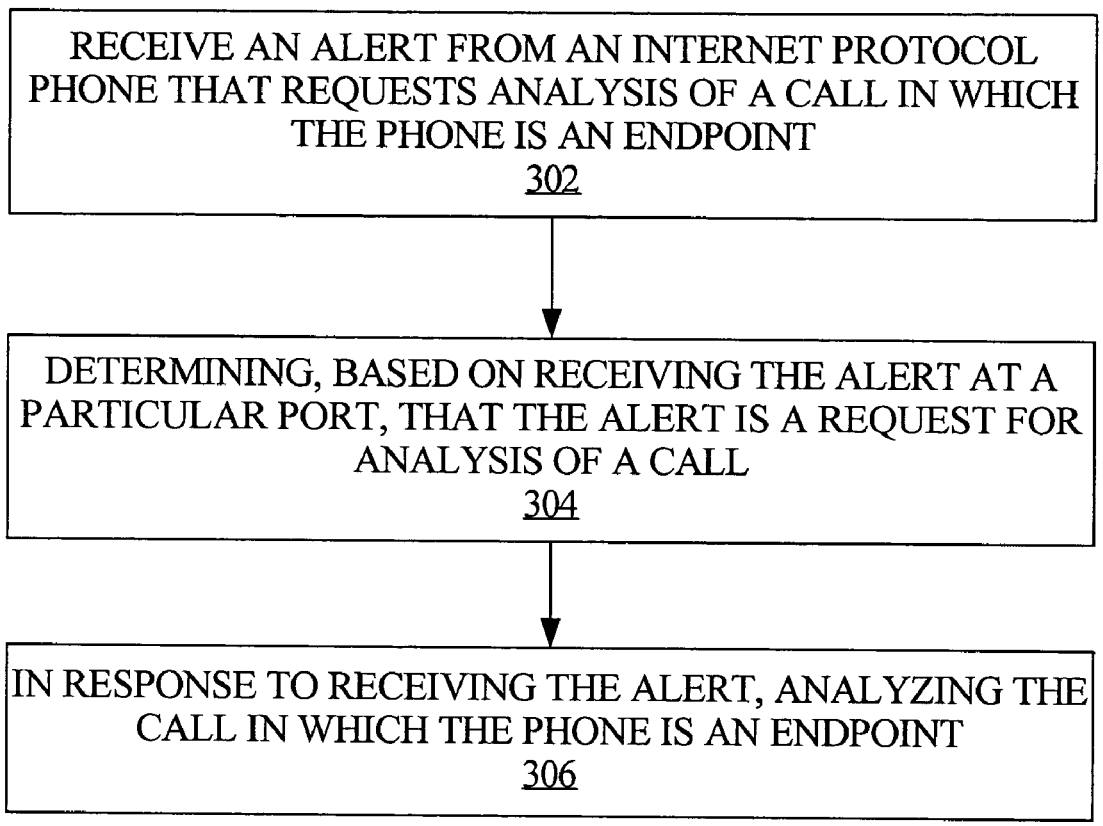
FIG. 3 is a flow diagram that illustrates a process for call analysis initiated by an IP phone.

FIG. 3 is a flow diagram that illustrates a process for call analysis initiated by an IP phone. The process of FIG. 3 is performed, for example, by a NMS such as NMS 112 (FIG. 1) or any other suitable call analysis tool that is coupled to a network over which the initiating phone communicates.

At block 302, an alert is received from an IP phone, such as a phone 102a (FIG. 1). The alert functions as a request for analysis of the call in which the IP phone is an endpoint. Any of the alerts described in reference to blocks 202-214 of FIGS. 2A and 2B may serve as the alert received at block 302.

In an embodiment, at block 304, based on receiving the alert at a particular port it is determined that the alert is a request for analysis of a call. In keeping with a prior example, if NMS 112 (FIG. 1) receives a message at port 8888, it determines that the message is a request for analysis of a particular phone call. The packet header associated with the message will inform the NMS 112 of the requesting phone's network address. From the information provided in the alert message, NMS 112 can identify the destination endpoint, for call analysis, such as through call detail record 107 (FIG. 1) obtained from call manager 106a (FIG. 1).

At block 306, in response to receiving the alert at block 302, the call in which the requesting phone is an endpoint is analyzed. For example, NMS 112 may utilize automated path analysis or invoke a service assurance agent to assist in analysis of the call, as described above.

4.3 Hardware Overview

Figure 4A:
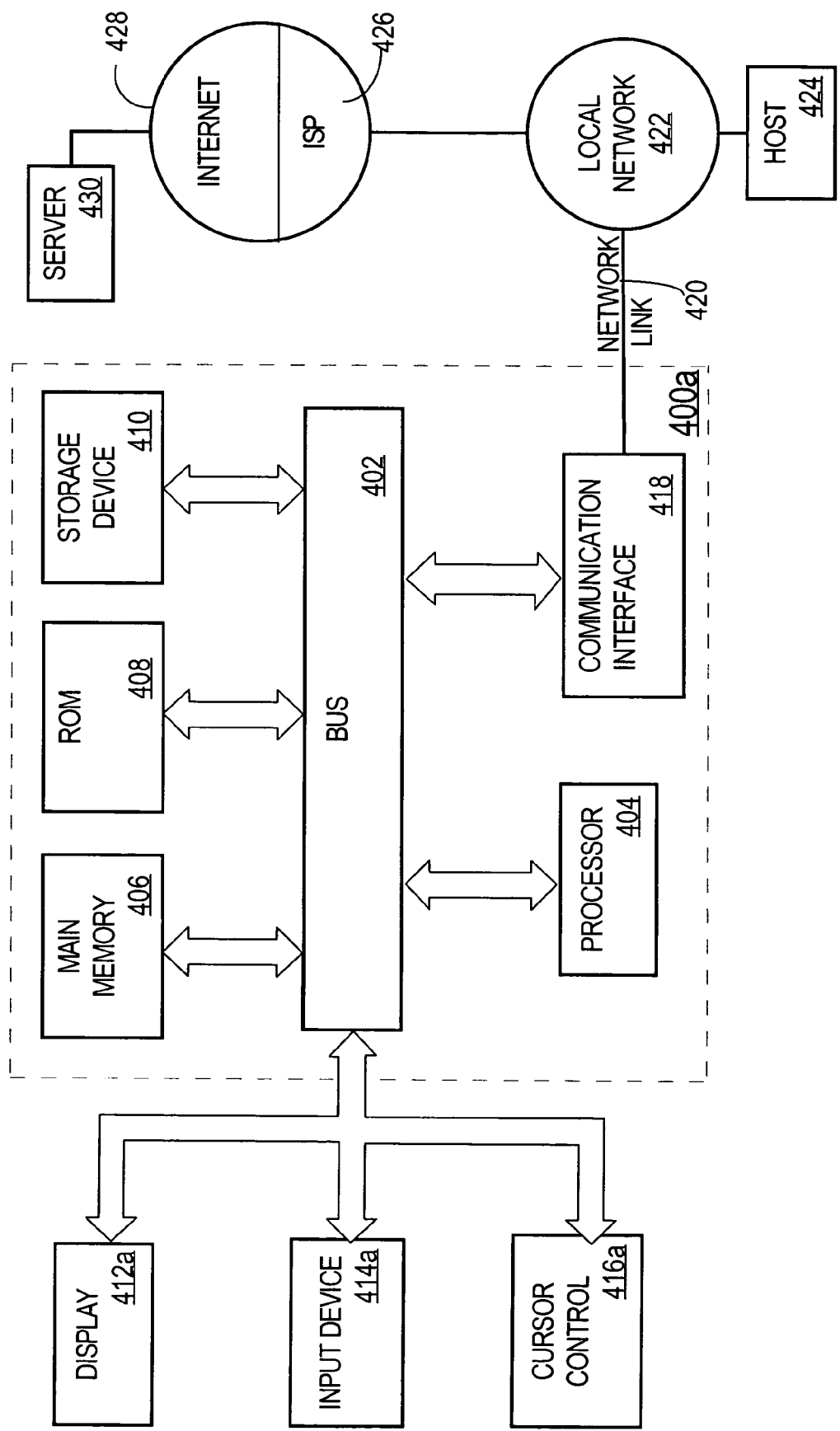
FIG. 4A is a block diagram that illustrates a computer system upon which embodiments may be implemented.

FIG. 4A is a block diagram that illustrates a computer system 400a upon which embodiments of the invention may be implemented. One aspect is implemented using one or more computer programs running on a telephone device. Thus, according to that aspect, the computer system 400a is a telephone computer system.

Computer system 400a includes a bus 402 or other communication mechanism for communicating information, and a processor 404 coupled with bus 402 for processing information. Computer system 400a also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400a further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400a may be coupled via bus 402 to a display 412a, such as a cathode ray tube (CRT), for displaying information to a computer user. An input device 414a, including alphanumeric and other keys, is coupled to bus 402 for communicating information and command selections to processor 404. Another type of user input device is cursor control 416a, such as a mouse, a trackball, or cursor direction keys for communicating direction information and command selections to processor 404 and for controlling cursor movement on display 412a. This input device typically has two degrees of freedom in two axes, a first axis (e.g., x) and a second axis (e.g., y), that allows the device to specify positions in a plane.

The invention is related to the use of computer system 400a for initiating analysis of a call. According to one embodiment of the invention, initiation of analysis of a call is provided by computer system 400a embodied in an IP telephone, in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400a can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400a also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400a, are exemplary forms of carrier waves transporting the information.

Computer system 400a can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for initiation of call analysis as described herein.

The received code may be executed by processor 404 as it is received, and/or stored in storage device 410, or other non-volatile storage for later execution. In this manner, computer system 400a may obtain application code in the form of a carrier wave.

Figure 4B:
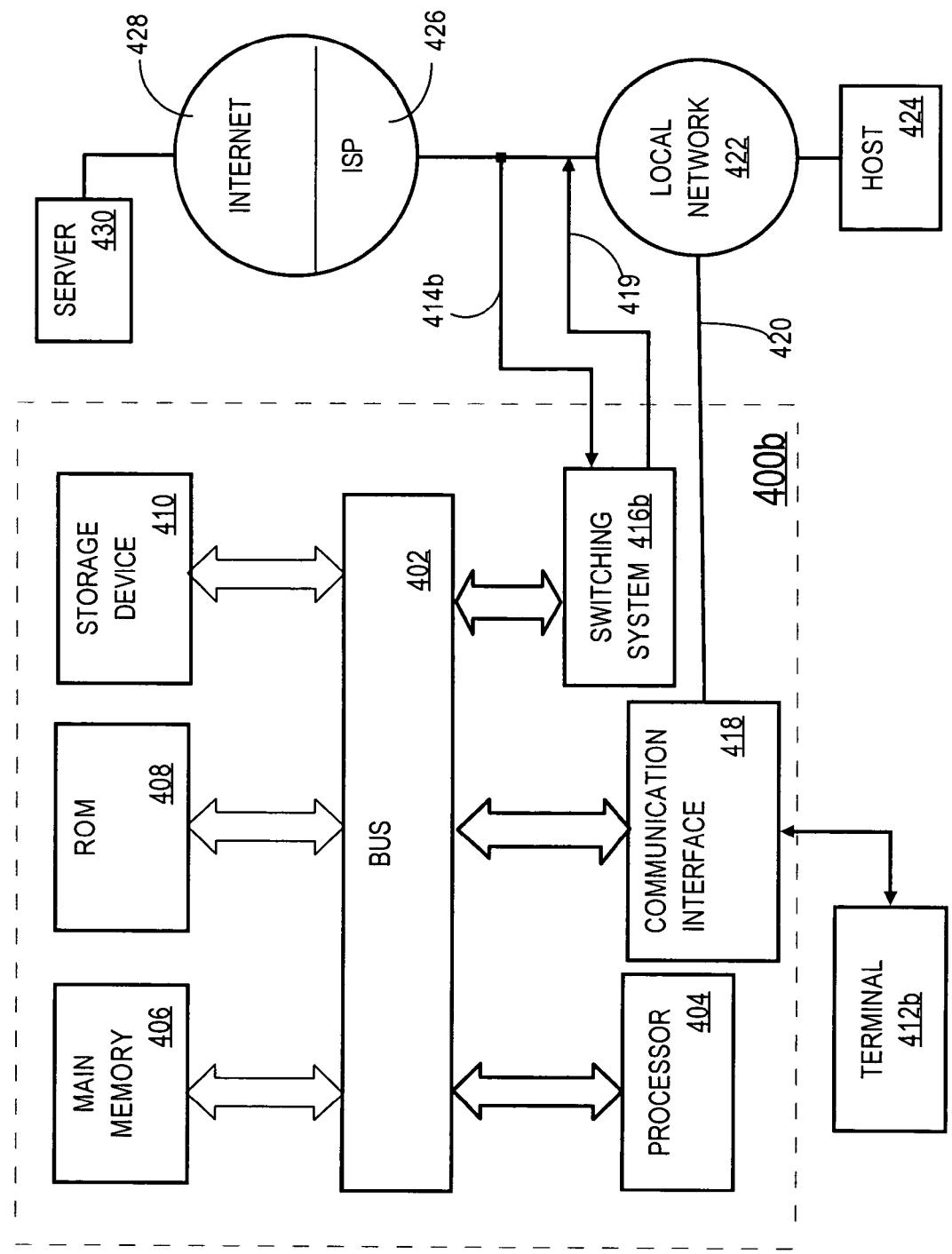
FIG. 4B is a block diagram that illustrates a computer system upon which embodiments may be implemented.

FIG. 4B is a block diagram that illustrates a computer system 400b upon which embodiments of the invention may be implemented. One aspect is implemented using one or more computer programs, such as a network management system, running on a network element such as a router, gateway, server, or the like. Thus, according to that aspect, the computer system 400b is a router, gateway, server, or the like. Most components illustrated in computer system 400b are similar to like-numbered components illustrated in computer system 400a and described in reference to FIG. 4A. Therefore, the components that are different in computer systems 400a and 400b are described below.

An external terminal 412b or other computer system connects to the computer system 400b and provides commands to it using the interface 418. Firmware or software running in the computer system 400b provides a terminal interface or character-based command interface so that external commands can be given to the computer system.

A switching system 416b is coupled to bus 402 and has an input interface 414b and an output interface 419 to one or more external network elements. The external network elements may include a local network 422 coupled to one or more hosts 424, or a global network such as Internet 428 having one or more servers 430. The switching system 416b switches information traffic arriving on input interface 414b to output interface 419 according to pre-determined protocols and conventions that are well known. For example, switching system 416b, in cooperation with processor 404, can determine a destination of a packet of data arriving on input interface 414b and send it to the correct destination using output interface 419. The destinations may include host 424, server 430, other end stations, or other routing and switching devices in local network 422 or Internet 428.

The invention is related to the use of computer system 400b for techniques and functions described herein in a network system. According to one embodiment of the invention, such techniques and functions are provided by computer system 400b in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for initiating analysis of a call from an Internet Protocol (IP) phone, the method comprising computer-implemented steps of:
   accessing, by the phone, configuration information associated with the phone, wherein the configuration information includes information about an associated network management system;
   automatically initiating, from the phone, transmitting an alert to the network management system, wherein the alert informs the network management system about the call and requests the analysis;
   determining, by the phone, an issue with the call that warrants analysis of the call by performing steps selected from the group consisting of:
   (a) determining that an elapsed time from the phone going off hook to receiving a message at the phone that instructs the phone to play a dial tone exceeds a particular value;
   (b) transmitting to a call manager a representation of a phone number that is associated with a called party, and determining that a message was not received from the call manager in response to the representation;
   (c) waiting for RTP packets from a called endpoint, and determining that a particular time interval has elapsed before receiving an RTP packet from the called endpoint;

(d) determining that a play-out time interval that is associated with a dejitter buffer that is associated with the phone is greater than a particular value;

(e) recording a first number of packets that are dropped before reaching the phone, by using a previous packet sequence number and a current packet sequence number, recording a second number of packets that are dropped by a dejitter buffer that is associated with the phone, by using a previous packet sequence number and a current packet sequence number, and determining that a product of a sum of the first number of packets that are dropped before reaching the phone and the second number of packets that are dropped by the dejitter buffer, and a packetization delay that is associated with a codec that is associated with the call, is greater than a particular value;

(f) determining that RTP packets are not received continuously by the phone for a period greater than a particular value; and (g) determining that a ratio of total packets lost before reaching the phone divided by total packets received at the phone is greater than a particular value.

2. The method of claim 1, wherein the particular value in the step of determining that an elapsed time from the phone going off hook to receiving a message at the phone that instructs the phone to play a dial tone exceeds a particular value is 250 ms.

3. The method of claim 1, wherein the representation of the phone number is a DTMF tone.

4. The method of claim 1, wherein the particular time interval in the step of determining that a particular time interval has elapsed before receiving an RTP packet from the called endpoint is 1000 ms.

5. The method of claim 1, wherein the particular value in the step of determining that a play-out time interval that is associated with a dejitter buffer that is associated with the phone is greater than a particular value is 150 ms.

6. The method of claim 1, wherein the particular value in the step of determining that a product of a sum of the first number of packets that are dropped before reaching the phone and the second number of packets that are dropped by the dejitter buffer, and a packetization delay that is associated with a codec that is associated with the call, is greater than a particular value is 500 ms.

7. The method of claim 1, wherein the particular value in the step of determining that RTP packets are not received continuously by the phone for a period greater than a particular value is 500 ms.

8. The method of claim 1, wherein the particular value in the step of determining that a ratio of total packets lost before reaching the phone divided by total packets received at the phone is greater than a particular value is 5%.

9. The method of claim 1, wherein the step of accessing includes accessing the configuration information from a remote server.

10. The method of claim 9, wherein the step of accessing includes accessing the configuration information from a Trivial File Transfer Protocol server.

11. A computer-readable storage medium storing one or more sequences of instructions for initiating analysis of a call from an Internet Protocol (IP) phone, which instructions, when executed by one or more processors, cause the one or more processors to carry out the steps of:

accessing, by the phone, configuration information associated with the phone, wherein the configuration information includes information about an associated network management system; and automatically initiating, from the phone, transmitting an alert to the network management system, wherein the alert informs the network management system about the call and requests the analysis;

determining, by the phone, an issue with the call that warrants analysis of the call by performing steps selected from the group consisting of:

(a) determining that an elapsed time from the phone going off hook to receiving a message at the phone that instructs the phone to play a dial tone exceeds a particular value;

(b) transmitting to a call manager a representation of a phone number that is associated with a called party, and determining that a message was not received from the call manager in response to the representation;

(c) waiting for RTP packets from a called endpoint, and determining that a particular time interval has elapsed before receiving an RTP packet from the called endpoint;

(d) determining that a play-out time interval that is associated with a dejitter buffer that is associated with the phone is greater than a particular value;

(e) recording a first number of packets that are dropped before reaching the phone, by using a previous packet sequence number and a current packet sequence number, recording a second number of packets that are dropped by a dejitter buffer that is associated with the phone, by using a previous packet sequence number and a current packet sequence number, and determining that a product of a sum of the first number of packets that are dropped before reaching the phone and the second number of packets that are dropped by the dejitter buffer, and a packetization delay that is associated with a codec that is associated with the call, is greater than a particular value;

(f) determining that RTP packets are not received continuously by the phone for a period greater than a particular value; and (g) determining that a ratio of total packets lost before reaching the phone divided by total packets received at the phone is greater than a particular value.

12. The computer-readable storage medium of claim 11, wherein the particular value in the step of determining that an elapsed time from the phone going off hook to receiving a message at the phone that instructs the phone to play a dial tone exceeds a particular value is 250 ms.

13. The computer-readable storage medium of claim 11, wherein the representation of the phone number is a DTMF tone.

14. The computer-readable storage medium of claim 11, wherein the particular time interval in the step of determining that a particular time interval has elapsed before receiving an RTP packet from the called endpoint is 1000 ms.

15. The computer-readable storage medium of claim 11, wherein the particular value in the step of determining that a play-out time interval that is associated with a dejitter buffer that is associated with the phone is greater than a particular value is 150 ms.

16. The computer-readable storage medium of claim 11, wherein the particular value in the step of determining that a product of a sum of the first number of packets that are dropped before reaching the phone and the second number of packets that are dropped by the dejitter buffer, and a packetization delay that is associated with a codec that is associated with the call, is greater than a particular value is 500 ms.

17. The computer-readable storage medium of claim 11, wherein the particular value in the step of determining that RTP packets are not received continuously by the phone for a period greater than a particular value is 500 ms.

18. The computer-readable storage medium of claim 11, wherein the particular value in the step of determining that a ratio of total packets lost before reaching the phone divided by total packets received at the phone is greater than a particular value is 5%.

19. The computer-readable storage medium of claim 11, wherein the step of accessing includes accessing the configuration information from a remote server.

20. The computer-readable storage medium of claim 19, wherein the step of accessing includes accessing the configuration information from a Trivial File Transfer Protocol server.

21. A system for initiating analysis of a call from an Internet Protocol (IP) phone, the system comprising:
   means for accessing, by the phone, configuration information associated with the phone, wherein the configuration information includes information about an associated network management system; and
   means for automatically initiating, from the phone, transmitting an alert to the network management system, wherein the alert informs the network management system about the call and requests the analysis;
   means for determining, by the phone, an issue with the call that warrants analysis of the call by performing functions selected from the group consisting of:
      (a) determining that an elapsed time from the phone going off hook to receiving a message at the phone that instructs the phone to play a dial tone exceeds a particular value;
      (b) transmitting to a call manager a representation of a phone number that is associated with a called party, and determining that a message was not received from the call manager in response to the representation;
      (c) waiting for RTP packets from a called endpoint, and determining that a particular time interval has elapsed before receiving an RTP packet from the called endpoint;
      (d) determining that a play-out time interval that is associated with a dejitter buffer that is associated with the phone is greater than a particular value;
      (e) recording a first number of packets that are dropped before reaching the phone, by using a previous packet sequence number and a current packet sequence number, recording a second number of packets that are dropped by a dejitter buffer that is associated with the phone, by using a previous packet sequence number and a current packet sequence number, and determining that a product of a sum of the first number of packets that are dropped before reaching the phone and the second number of packets that are dropped by the dejitter buffer, and a packetization delay that is associated with a codec that is associated with the call, is greater than a particular value;
      (f) determining that RTP packets are not received continuously by the phone for a period greater than a particular value; and
      (g) determining that a ratio of total packets lost before reaching the phone divided by total packets received at the phone is greater than a particular value.

22. An Internet Protocol (IP) telephony system that can initiate analysis of a call, the system comprising:
   a network interface;
   a processor coupled to the network interface and receiving messages from a network through the network interface;
   a computer-readable medium comprising one or more stored sequences of instructions which, when executed by the processor, cause the processor to carry out the steps of:
      accessing, by the phone, configuration information associated with the phone, wherein the configuration information includes information about an associated network management system; and
   automatically initiating, from the phone, transmitting an alert to the network management system, wherein the alert informs the network management system about the call and functions as a request for the analysis;
   determining, by the phone, an issue with the call that warrants analysis of the call by performing steps selected from the group consisting of:
      (a) determining that an elapsed time from the phone going off hook to receiving a message at the phone that instructs the phone to play a dial tone exceeds a particular value;
      (b) transmitting to a call manager a representation of a phone number that is associated with a called party, and determining that a message was not received from the call manager in response to the representation;
      (c) waiting for RTP packets from a called endpoint, and determining that a particular time interval has elapsed before receiving an RTP packet from the called endpoint;
      (d) determining that a play-out time interval that is associated with a dejitter buffer that is associated with the phone is greater than a particular value;
      (e) recording a first number of packets that are dropped before reaching the phone, by using a previous packet sequence number and a current packet sequence number, recording a second number of packets that are dropped by a dejitter buffer that is associated with the phone, by using a previous packet sequence number and a current packet sequence number, and determining that a product of a sum of the first number of packets that are dropped before reaching the phone and the second number of packets that are dropped by the dejitter buffer, and a packetization delay that is associated with a codec that is associated with the call, is greater than a particular value;
      (f) determining that RTP packets are not received continuously by the phone for a period greater than a particular value; and
      (g) determining that a ratio of total packets lost before reaching the phone divided by total packets received at the phone is greater than a particular value.

* * * * *